United States Patent [19]

Murdock et al.

[11] Patent Number: 5,138,016

[45] Date of Patent: Aug. 11, 1992

[54] ISOCYANURATE-FREE OXAZOLIDONE COMPOUND MADE FROM EPOXY AND A HINDERED ISOCYANATE COMPOUND AND A NOVEL CATALYST FOR THEIR PRODUCTION

[75] Inventors: Thomas O. Murdock, Vadnais Heights; Brian W. Carlson, Woodbury, both of Minn.

[73] Assignee: H. B. Fuller Company, Saint Paul, Minn.

[21] Appl. No.: 629,242

[22] Filed: Dec. 18, 1990

[51] Int. Cl.$^5$ ............................................. C08G 18/22
[52] U.S. Cl. ..................................... 528/55; 525/452; 526/221; 526/270; 526/311; 528/59; 528/73; 548/231
[58] Field of Search ................ 548/231; 525/452; 526/221, 270, 311; 528/55, 59, 73

[56] References Cited

U.S. PATENT DOCUMENTS

| | | | |
|---|---|---|---|
| 3,313,747 | 4/1967 | Schramm | 528/73 |
| 3,702,839 | 11/1972 | Glasgow et al. | 528/73 |
| 3,817,938 | 6/1974 | Ashida et al. | 528/57 |
| 3,905,945 | 9/1975 | Iseda et al. | 528/73 |
| 4,066,628 | 1/1978 | Ashida et al. | 528/57 |
| 4,424,316 | 1/1984 | DiSalvo et al. | 525/528 |
| 4,613,660 | 9/1986 | Goel et al. | 528/73 |
| 4,658,007 | 4/1987 | Marks et al. | 528/55 |
| 4,731,428 | 3/1988 | Waterman | 528/69 |
| 4,879,365 | 11/1989 | Petschke et al. | 528/49 |
| 4,980,497 | 12/1990 | Sasagawa et al. | 548/231 |

OTHER PUBLICATIONS

Sandler, "Preparation of Mono and Poly-2-Oxazolidones from 1-2 Epoxides and Isocyanates," *Journal of Polymer Science:* Part A-1, vol. 5, pp. 1481-1485 (1967).
Dileone, "Synthesis of Poly-2-Oxazolidone from Diisocyanates and Diepoxides," *Journal of Polymer Science:* Part A-1, vol. 8, pp. 609-615 (1970).
Herweh, et al., "2-Oxazolidones Via the Lithium Bromide Catalyzed Reaction of Isocyanates with Epoxides in Hydrocarbon Solvents," *Tetrahedron Letters*, No. 12, pp. 809-812 (1971).
Sehovic, et al., "Poly-2-Oxazolidone Urethane Coatings," *Journal of Coatings Technology*, vol. 59, pp. 29-35 (1987).

Primary Examiner—Maurice J. Welsh
Assistant Examiner—Rachel Johnson
Attorney, Agent, or Firm—Merchant, Gould, Smith, Edell, Welter & Schmidt

[57] ABSTRACT

Significant improvements in the utility of oxazolidone and polyoxazolidone compounds and in their manufacture can be achieved using a novel catalyst in the reaction between a hindered isocyanate and an epoxy, forming oxazolidone ring structures. The novel catalyst of the invention promotes the efficient and rapid formation of oxazolidone and polyoxazolidone compounds. The use of hindered isocyanate in the reaction prevents formation of side reaction products such as isocyanate trimer, allophanate and biuret.

31 Claims, No Drawings

ISOCYANURATE-FREE OXAZOLIDONE COMPOUND MADE FROM EPOXY AND A HINDERED ISOCYANATE COMPOUND AND A NOVEL CATALYST FOR THEIR PRODUCTION

FIELD OF THE INVENTION

The invention relates to the catalyzed reaction of epoxy and hindered isocyanate to produce oxazolidone and polyoxazolidone compounds that can be used as adhesives, sealants, caulks, coatings, including powder coatings and other applications of reactive curing chemistry. These compounds have structural or engineering uses, can be used in prepregs, in injection molded articles, etc., and in any other area where thermoplastics or thermosetting resins have utility. The focus of the invention is on the catalyzed reaction of a compound having an epoxide and a hindered isocyanate in the production of oxazolidone compounds.

In particular, the catalyzed reaction of interest can be used to: (1) form linear thermoplastic polyoxazolidone polymers; (2) form epoxy-terminated oxazolidone prepolymers that can be cured with conventional epoxy curing agents; (3) form other oxazolidone-containing materials such as oxazolidone-containing vinyl monomers and polymers thereof, epoxy curing adhesives, etc. The oxazolidone compounds produced in this invention provide significantly improved utility, lifetime, and curing properties because of the substantial absence of isocyanurate compounds generated by a competing trimerization reaction of isocyanate compounds.

BACKGROUND OF THE INVENTION

Epoxy compounds and isocyanate compounds are known to react to form oxazolidones. The reaction is also known to form substantial quantities of undesirable by-products. A major by-product results from the trimerization of isocyanates to isocyanurate, allophanate and biuret compounds, which are highly functional and typically give rise to highly crosslinked and brittle polymers. A reaction product free of such impurity exhibits improved thermal and mechanical properties compared to one containing a higher proportion of isocyanurate compounds.

Oxazolidones are heterocyclic ring systems containing nitrogen and oxygen functionality, which can be generically represented by the following formula (I):

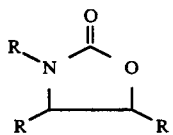

Most conventional catalysts used in preparing such compounds do not efficiently and cleanly drive the reaction to completion.

In large part, the catalysts available in the prior art are of low activity, are generally difficult and unsafe to handle, are not available in commercial quantities, are used only in solvent, or are otherwise unacceptable for a commercial setting. Some also promote epoxy polyether formation.

Ashida, U.S. Pat. No. 4,066,628 teaches the use of a catalyst selected from the group consisting of $ZnR_2$, $Zn(OCOR)_2$, $ZnX$ and $AlR_3$ wherein R is an alkyl group having 1 to 12 carbon atoms and X is an organic bidentate group. The preparation of oxazolidones from an organic isocyanate and an epoxide using a quaternary ammonium halide and an alcohol as cocatalysts is disclosed in Schramm; U.S. Pat. No. 3,313,747. Zinc chloride and ferric chloride have been proposed as catalysts for the foregoing reaction [K. Gulbins and K. Hamann, *Angew. Chem.*, 70, 705 (1958)]. Zinc bromide has been proposed as a catalyst for the reaction of an epoxide, 3-phenoxy-1,2-propylene, and phenylisocyanate in dimethylformamide, with only 33% yield of the oxazolidone [Sandler, *J. Polymer Science*, Part A-1, 5, 1481 (1967)]. Lithium chloride has been found by K. Gulbins to be a catalyst for the reaction between an aromatic isocyanate and an aromatic epoxide [*Chem. Ber.*, 93, 1875, (1960)]. Lithium n-butoxide has been found by R. R. Deleone to be an oxazolidone catalyst [*J. Polymer Science*, Part A-1, 8, 609, (1970)]. An adduct of lithium bromide and tributyl phosphine oxide has been reported by J. E. Herweh and W. J. Kauffman to be an oxazolidone catalyst [*Tetrahedron Letters*, no. 12, 809, (1971)]. Glasgow, U.S. Pat. No. 3,702,839 (Nov. 14, 1972) discloses that a phosphonium salt is an oxazolidone catalyst. S. Kimura and H. Samejima (Japanese Patent Public Disclosure 48-70797, September 25, 1973) disclose that monomer-soluble catalysts selected from the group consisting of specific organic metal chelates, alkyl glycidyl ammonium salts, trialkyl (triaryl or tricycloalkyl) borates, and trialkyl (or triaryl) phosphines are oxazolidone catalysts. Y. Iseda and F. Odaka et al. (Japanese Patent Public Disclosure 49-37999, Apr. 9, 1974) disclose that epoxy-soluble quaternary ammonium compounds and/or lithium halidephosphine oxide complexes are oxazolidone catalysts. Ashida, U.S. Pat. No. 3,817,938 (Jun. 18, 1974) discloses that alkoxides or phenoxides of metals of Group IIA or IIIA of the Periodic Table are oxazolidone catalysts. M. J. Marks et al., U.S. Pat. No. 4,658,007 (Apr. 14, 1987) disclose the preparation of an oxazolidone-containing polymer or precursor from a polyepoxide and a polyisocyanate using an organoantimony iodide catalyst. We are also aware of DiSalvo, U.S. Pat. No. 4,424,316; Goel, U.S. Pat. No. 4,613,660; and Waterman, U.S. Pat. No. 4,731,428, each of which relates to the reaction of epoxy compounds and isocyanate compounds in the preparation of curing materials. Standard catalyst systems do not efficiently drive the oxazolidone forming reaction. Further, standard isocyanates such as MDI and TDI form unwanted reaction by-products. In view of these facts, a substantial need exists for a reaction system including isocyanate reactants and catalyst that cooperate to smoothly form oxazolidone without substantial formation of reaction by-product.

SUMMARY OF THE INVENTION

We have found a system, including isocyanate reactant and catalyst, that can be used in the rapid and efficient production of oxazolidone compounds without the concurrent formation of trimer isocyanurate impurities. The system involves the catalyzed reaction of an epoxy-containing compound and a hindered isocyanate. The catalyst comprises zinc halide ($ZnX_2$), such as zinc iodide, zinc bromide, and zinc chloride. The in-situ production of a zinc halide catalyst can also be utilized in the process of the invention. For example, zinc iodide can be produced through the reaction of a zinc compound and an iodide compound (a non-limiting example of an in situ preparation is: $ZnA + 2\ MI \rightarrow ZnI_2 + 2\ MA$, wherein M is a monovalent metal cation and A is a monovalent displaceable anion). We have found that the hindered isocyanate of this invention will not trimerize under the reaction conditions disclosed. Further, the novel catalysts smoothly convert isocyanate and epoxy to oxazolidone. The effects together result in high yields of oxazolidone free of unwanted reaction by-products. The catalyst system is stable and is soluble and active in hot-melt and solvent-free systems, is tolerant of water and atmospheric impurities, requires no special handling, and is easily blended into the system.

A first aspect of the invention comprises a process for the preparation of oxazolidone compounds in the presence of a zinc halide catalyst system. A second aspect of the invention comprises a linear polyoxazolidone polymer comprising the product of reaction of a polyepoxy compound and a hindered polyisocyanate compound in the presence of the zinc halide catalyst system. A further aspect of the invention comprises an epoxy-terminated prepolymer prepared from a polyepoxy compound and the product of the reaction of a hindered polyisocyanate and hydroxy-terminated prepolymer, i.e., polymeric polyol. A still further aspect comprises a vinyl monomer having an oxazolidone or polyoxazolidone functionality and vinyl polymers made using such a monomer having pendant oxazolidone functionality. A final aspect of the invention is a functional material such as an adhesive, sealant, coating, potting compound, powder coating etc., with an oxazolidone or polyoxazolidone compound of the invention.

DETAILED DESCRIPTION OF THE INVENTION

The invention provides an improved process for the preparation of oxazolidone and polyoxazolidone products comprising the reaction of a hindered organic isocyanate compound and an epoxy compound in the presence of an effective amount of a catalyst compound comprising a zinc halide, i.e., $ZnCl_2$, $ZnBr_2$, and $ZnI_2$, or an in situ generated zinc halide. The invention provides for an efficient production of oxazolidone compounds that are substantially free of trimer isocyanurate and other impurities due to the presence of hindered isocyanate. Preferably the oxazolidone and polyoxazolidone materials are produced by the process of the invention such that there is less than about 1 wt-% of the isocyanurate compound present.

The term "in situ generated zinc halide" indicates the inclusion of zinc and halide-containing reactants, in the reaction mixture of the isocyanate and the epoxy compound, that can react sufficiently rapidly to form a zinc halide to catalyze the formation of the oxazolidone. In preparing the polyoxazolidones by the reaction of an organic polyisocyanate with a polyepoxy compound, the relative amounts of the organic polyisocyanate and the polyepoxy can be adjusted to produce the desired reaction products.

The hindered isocyanate-epoxide reaction, catalyzed by the zinc halide catalyst system of the present invention, is preferably carried out in the melt form in an absence of solvent at an elevated temperature in the range of about 80° C. to about 250° C. for a period of time up to about 10 hours. Choice of the zinc halide catalyst can vary depending on the desired product, solubility of the catalyst in the reactants, and the process conditions. Preferably the catalyst is $ZnI_2$, which is the most widely useable of the zinc halides in the preparation of linear oxazolidones, vinyl monomers and polymers containing oxazolidone functionality, or oxazolidone prepolymers.

The catalyst is present in an amount sufficient to affect formation of the polyoxazolidone ring in a sufficiently short period of time to be of commercial interest. The exact amount of catalyst present in any particular instance can vary depending on desired product and the process conditions, but preferably it is present in the reaction mixture in an amount within the range of about 0.01 to about 4 wt-% based on the total weight of organic and inorganic reactants. More preferably, the amount of catalyst present is in the range of about 0.1 to 2 wt-%. The oxazolidone product formed from the reaction of the polyepoxide and polyisocyanate in the presence of a zinc halide catalyst typically contains less than about 0.2 wt-% of a zinc halide catalyst residue.

The term "oxazolidone compound" as used in this application includes both monomer or small molecule compounds and polymers having repeating oxazolidone polymer backbone structures or vinyl polymers with pendant oxazolidone groups. The general representation of an oxazolidone compound is shown above in Formula I.

The term "hindered organic isocyanate" as used herein and in the claims is taken to mean an organic compound containing one or more isocyanate groups (—NCO) wherein the nitrogen atom of the isocyanate compound is directly attached to a tertiary carbon atom. The tertiary carbon atom can be a carbon atom in an aliphatic group and can also be an aliphatic ring carbon atom. These aliphatic carbon atoms can also be substituents on aromatic ring systems. Non-limiting examples of such a tertiary bonded isocyanate group are shown in the following formulae:

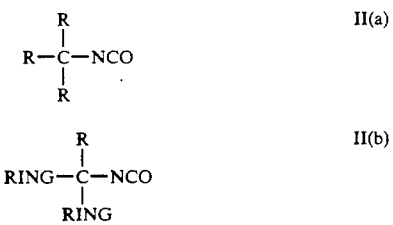

wherein R is a $C_{1-12}$ alkyl, aryl, etc., group. The above formulae show the isocyanate group attached to a tertiary alkyl carbon, II(a), and within a ring system, II(b), having a tertiary carbon (the unfilled valences representing the ring). The tertiary carbon or ring carbon can be a portion of an inorganic compound having virtually any structure or substituent.

Hindered isocyanate compounds for use in this invention include aliphatic and aromatic compounds with a hindered isocyanate substituent wherein the tertiary carbon is attached to an aromatic ring structure represented by the following formula (III):

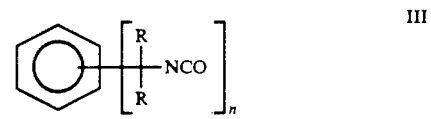

wherein R is a $C_{1-12}$ alkyl, aryl, etc., group, the aromatic ring is merely a representation of a substituted ring or multiring system, and preferably n = 1-3.

The preferred compounds are isocyanate compounds formed on aromatic ring structures wherein the hindered isocyanate group can be substituted meta, ortho, or para to a vinyl group or to a second hindered isocyanate group. Such compounds include hindered aromatic diisocyanate compounds and vinyl-substituted hindered monoisocyanate aromatic monomers. Representative examples of the most preferred isocyanate compounds comprises m-TMI and m-TMXDI [known as 3-isopropenyl(α,α-dimethylbenzyl)isocyanate and 1,3-bis(α-isocyanatoisopropyl)benzene, respectively]. The isocyanate compound referred to as m-TMXDI is also known as tetramethylxylylenediisocyanate. Also beneficial and preferred would be the para isomers of these compounds, i.e., 4-isopropenyl(α,α-dimethylbenzyl)isocyanate and 1,4-bis-(α-isocyanatoisopropyl)benzene, respectively. Most preferred are the hindered aromatic diisocyanate compounds.

The term "epoxy" as used herein and in the appended claims is taken to mean a compound containing one or more epoxy groups, i.e., oxirane rings, generally represented by the following formula (IV):

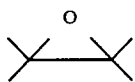

IV

Useful epoxides can contain aromatic, aliphatic, or cycloaliphatic groups. They can be mono- or polyepoxides. Herein "poly-" functional compounds include within their scope difunctional compounds. Examples of useful monoepoxy compounds are phenyl glycidyl ether, allyl glycidyl ether, and epichlorohydrin. Suitable polyepoxides include the resinous reaction products of an epihalohydrin with, for example, bisphenol A (2,2-bis(4-hydroxyphenyl)propane), bisphenol F (bis(4-hydroxyphenyl)methane), or halogenated derivatives thereof. Such materials are available commercially under the tradenames DER ™ and EPON ™ from Dow Chemical Company and Shell Chemical Company, respectively.

Epoxide compounds with two or more epoxy groups define a preferred class of materials. Although some polyepoxides can have as many as 100 or more epoxy groups, it is more preferred that the functionality of the polyepoxide be relatively low, i.e., from about 2 to 10, and most preferably from about 2 to about 4. Epoxides with lower functionality are preferable and advantageous for certain applications because they typically give rise to less highly crosslinked polymers, which tend to have better physical and thermal properties as well as being more easily processed. For example, diepoxides are used in combination with diisocyanates to form linear thermoplastic polymers. A preferred group of diepoxides include the diglycidyl ethers of bisphenol A, bisphenol F, hydrogenated bisphenol A, butanediol, neopentylglycol, and mixtures thereof.

A useful group of epoxy compounds are aromatic in nature. These include, for example, glycidyl ethers of polyhydric mononuclear and fused-ring polynuclear phenols such as resorcinol, hydroquinone, pyrocatechol, saligenin, phloroglucinol, 1,5-dihydroxynaphthalene, 1,6-dihydroxynaphthalene, 1,7-dihydroxynaphthalene, and the like.

This group of aromatic epoxy compounds also includes the glycidyl ethers of nonfused ring polynuclear phenols, which can be prepared from the reaction of epichlorohydrin or epibromohydrin and a nonfused-ring polynuclear phenol represented by the general formula (V):

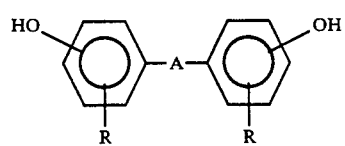

wherein R represents 0 to 4 substituents selected from the class consisting of halogen and lower alkyl, and A is a bridging group selected from the class consisting of alkylene, substituted alkylene, carbonyl, ether, sulfide, sulfone, and a single covalent bond. Herein, "lower alkyl" means an alkyl group containing from one to six carbon atoms.

Typical examples of such nonfused-ring epoxy compounds are diglycidyl ethers of the following phenolic compounds: 4,4'-dihydroxydiphenylsulfone, 4,4'-dihydroxybiphenyl, 4,4'-dihydroxybenzophenone, bis(4-hydroxyphenyl)methane (bisphenol F), 2,2-bis(4-hydroxyphenyl)butane (bisphenol B), 2,2-bis(4-hydroxyphenyl)propane (bisphenol A), 1,1-bis(4-hydroxyphenyl)propane, 3,3-bis(4-hydroxyphenyl)pentane, 2-(3-hydroxyphenyl)-2-(4-hydroxyphenyl)butane, 1-phenyl-1-(2-hydroxyphenyl)-1-(3-hydroxyphenyl)propane, 1-phenyl-1,1-bis(4-hydroxyphenyl)butane, 1-phenyl-1,1-bis(4-hydroxyphenyl)pentane, 1-tolyl-1,1-bis(4-hydroxyphenyl)ethane, bis(3-bromo-4-hydroxyphenyl)methane, 2,2-bis(3-bromo-4-hydroxyphenyl)propane, bis(3-bromo-4-hydroxyphenyl)diphenylmethane, 1,1-bis(3-bromo-4-hydroxyphenyl)-1-(2,5-dibromophenyl)ethane, bis(3,5-dibromo-4-hydroxyphenyl)methane, 2,2-bis(3,5-dibromo-4-hydroxyphenyl)propane, bis(3,5-dibromo-4-hydroxyphenyl)diphenylmethane, 1,1-bis(3,5-dibromo-4-hydroxyphenyl)-1-(2,5-dibromophenyl)ethane, bis(3-bromo-4-hydroxyphenyl)sulfone, bis(3,5-dibromo-4-hydroxyphenyl)sulfone.

The glycidyl ethers of novolac resins can also be used as the epoxy compound of the invention. The novolac resins are the products obtained by the acid condensation of phenol, or substituted phenol, with formaldehyde. The glycidyl ethers of such resins can be represented by the following general formula (VI):

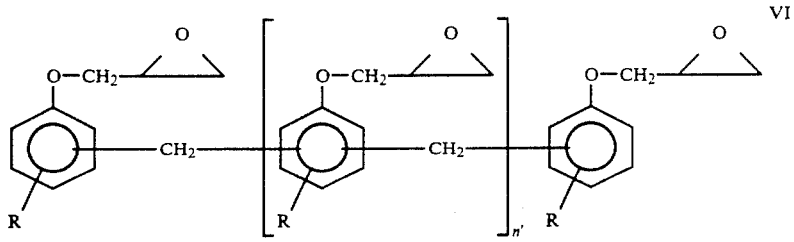

VI wherein n' has an average value of about 0 to 20, preferably 1 to 12; R represents from 0 to 4 substituents each independently selected from halogen, lower alkyl, aryl, and aralkyl groups, and preferably selected from halogen and lower alkyl groups. The above formula is highly idealized and is an approximation only. The compounds are prepared by the condensation of formaldehyde with phenolic compounds. Such a preparation method provides a wide variety of branched/unbranched systems with a variety of differing molecular weights, all of which are approximately represented by the above standard representation in the art.

Furthermore, dicyclopentadiene dioxide epoxies can be used. Such materials have the following formula (VII):

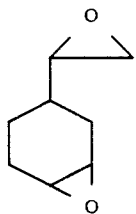

VII

Additionally, vinylcyclohexene dioxide, for example, the compound having the formula (VIII):

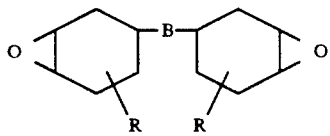

VIII can be used in the invention.

Dicyclohexyloxide carboxylates can also be used as the epoxy compound of the invention. Such compounds are represented by the general formula (IX):

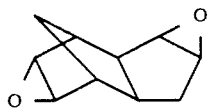

IX wherein R in each instance represents from 0 to 9 lower alkyl groups and B represents a divalent bridging radical selected from the class consisting of the following formula (X, XI, and XII):

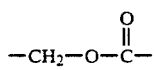

X

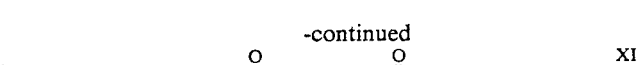

XI

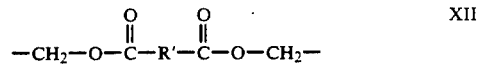

XII wherein R' is selected from the class consisting of lower alkylene, lower oxyalkylene, arylene, etc. Examples of the dicyclohexyloxidecarboxylatesare3,4-epoxycyclohexylmethyl-3,4-epoxycyclohexane carboxylate, 3,4-epoxy-6-methylcyclohexylmethyl-3,4-epoxy-6-methylcyclohexane carboxylate, bis(3,4-epoxycyclohexylmethyl)maleate, bis(3,4-epoxycyclohexylmethyl)succinante, ethylene[bis(3,4-epoxy-6-methylcyclohexane carboxylate)], and the like.

The glycidyl derivatives of aromatic primary amines can be used as the epoxy compound of the invention. These compounds are represented by the following formula (XIII):

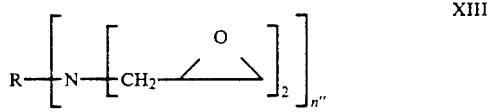

XIII wherein n" is an integer of 1 to 3; R is an aromatic residue of valency n" and is selected from the class consisting of aromatic residues such as phenyl, phenylene, diphenylene, etc. Illustrative of such compounds are the N,N-diglycidyl derivatives of aniline, 2,4-tolylene diamine, 2,6-tolylene diamine, m-phenylene diamine, p-phenylene diamine, 4,4'-diaminodiphenyl, 4,4-diaminodiphenylmethane, 2,2-bis(4-aminophenyl)propane, 2,2-bis(4-aminophenyl)butane, 4,4,-diaminodiphenyl sulfate, 4,4'-diaminodiphenyl sulfone, 4,4'-diaminodiphenyl ether, and 1,5-diaminenaphthalene, and similar methylene bridged polyphenyl polyamines from about 35 wt-% to about 85 wt-% of methylene dianilines. The remaining part of said mixture consists of triamines and polyamines of higher molecular weight. Such polyamine mixtures are formed through the condensation reaction of aniline and formaldehyde.

As stated above, epoxide compounds with two or more epoxy groups define a preferred class of starting materials. With respect to functionality, aromatic epoxides define a preferred class of starting materials, and the glycidyl ethers of nonfused-ring polynuclear phenols define a more preferred class. Examples of this class are listed above.

The catalyst used in the present invention comprises a zinc halide ($ZnX_2$, wherein X=Cl, Br, I). In the reaction of a hindered isocyanate and an epoxy, these catalysts efficiently produce substantially quantitative yields of an oxazolidone compound, without the formation of any significant amount of isocyanurate compounds. These catalysts, particularly $ZnI_2$, make the oxazolidone preparation commercially feasible, at least in part because they are relatively safe to use, easily handled, and relatively economical. $ZnI_2$ is also preferred because it is the most widely useable of the catalysts in the formation of the oxazolidone monomers and polymers of the invention. For example, in the preparation of linear oxazolidone polymers, the solubility of $ZnBr_2$ in the epoxy-isocyanate reactant mixture generally needs to be considered for effective catalytic activity.

The zinc halides can also be generated in situ in the reaction mixture comprising the epoxy and isocyanate compounds. This is accomplished by the addition of a zinc compound and an appropriate number of equivalents of a halide compound to the reaction mixture. The zinc and halide compounds react with sufficient rapidity to form a catalytic amount of zinc halide ($ZnX_2$) in situ before any substantial isocyanurate formation can occur. Useable zinc compounds include zinc acetate, zinc carbonate, zinc stearate, zinc naphthenate, zinc trifluoroacetate, zinc tetrafluoraborate, etc. Suitable halide compounds include, for example, potassium iodide, sodium iodide, copper (II) iodide, silver iodide, magnesium iodide, their respective bromide and chloride salts, etc. A particularly useful in situ combination is $Zn(OAc)_2$ and KI. The relative amounts of halide compound and zinc compound can be easily determined using conventional reaction calculations.

The relative amounts of the hindered isocyanate and the epoxy can be calculated by knowledge of the number of active epoxy groups in the epoxy compound, the number of active isocyanate groups in the isocyanate compound, and the desired end result. That is, the relative proportions of the epoxide and hindered isocyanate employed typically control the type of product formed. For example, if a stoichiometric excess of the isocyanate is used, an isocyanate-terminated oxazolidone compound results. Furthermore, the molecular weight of the resultant polymer can be controlled by the relative amounts of the starting materials. The use of relatively equivalent amounts of the epoxide and hindered isocyanate is a means of providing higher molecular weight polyoxazolidones. In general, however, the reaction of the present invention is conducted at a ratio of about 0.2 to 20 equivalents of epoxy functionality per equivalent to —NCO functionality and in the presence of an effective catalytic amount of a zinc halide or in situ generated zinc halide compound.

Substantially Linear Polymers Prepared Using the Oxazolidone Reaction

The preferred polyoxazolidone compounds of the invention are linear polymers made by reacting primarily diepoxy compounds with hindered diisocyanate compounds. The diepoxy compounds and diisocyanate compounds are as described above. The linear oxazolidone polymer compounds of the invention can be prepared by simply mixing a diepoxy compound at elevated temperature with a hindered diisocyanate compound in the presence of the $ZnX_2$ catalyst system. The quantity of zinc halide catalyst, e.g., the zinc iodide or in situ generated zinc iodide, employed can vary over a wide range depending on the process conditions. Preferably, the amount of catalyst is within the range of about 0.01% to about 4% by weight of the combined organic and inorganic reactants. More preferably, about 0.1 to 2 wt-% of the catalyst is used. Preferably, the catalyst used in the preparation of linear oxazolidone polymers is $ZnI_2$, at least in part because it is the most effective for a wide variety of reactant mixtures.

The linear oxazolidone polymers can take the form of a viscous liquid or a solid depending on the molecular weight. Molecular weights of the invention can vary from about 400 to 5,000 or higher, with molecular weights of about 500,000 possible. The polymeric compounds of the invention can be molded under heat and pressure as a thermoplastic or they can be further cured through the use of conventional curing, polymerization, or crosslinking agents. The cured polymeric compositions of the invention are well suited for structural applications such as gears, bearings, tires, ball joint liners, heel lifts, and for insulating and cushioning foams, coatings including powder coatings, potting, and encapsulation.

In the preparation of the linear oxazolidone polymers, a diepoxy compound and a hindered diisocyanate compound of the invention are preferably reacted at a ratio of about 0.2 to 5 equivalents of epoxy per equivalent of —NCO. More preferably, in the formation of the linear oxazolidone polymers, the hindered diisocyanate compound is reacted with the diepoxy compound at a ratio of about 0.5 to 2 equivalents of epoxy per equivalent of —NCO.

Most preferably, approximately equimolar proportions of diepoxy and hindered diisocyanate compounds are used if a purely thermoplastic nonreactive material is desired. In order to increase molecular weight, a stoichiometry of about 1:1 between the hindered diisocyanate and diepoxy compounds is used and the reaction is run for greater than about 2 hours at a temperature above 125° C.

The polymer reaction product is an alternating polymer where the residues alternate between residues arising from the diepoxy compound with residues arising from the diisocyanate compound. The linear polymer can be represented by the formula: (—A—R'—A—R")$_n$, wherein A is an oxazolidone residue having the formula (XIV):

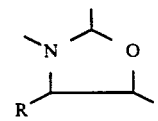

XIV wherein R' is a residue derived from the hindered diisocyanate compound used in the formation of the oxazolidone and R" comprises a residue derived from the diepoxy compound used in forming the oxazolidone; and wherein n is an integer of 1 to 1,000. The polymer terminus can comprise either free epoxy or free isocyanate groups. Slight excesses of isocyanate compound or epoxy compound would tend to result in a majority of the polymers having isocyanate end groups or conversely an excess of epoxy end groups, respectively.

After the formation of the linear oxazolidone polymers is complete, the terminal —NCO or epoxy reactive functionality can be quenched using conventional reagents that can react and neutralize the reactive character of the functional group. Such reactions leave the linear oxazolidone polymer as a thermoplastic material which can be injected, formed into a film, sheet, pellet, extruded into a shaped extrusion, pultruded with a reinforcing fiber, or applied to any other typical thermoplastic end use.

Vinyl Monomers and Polymers Containing Oxazolidone Moieties and Epoxy Function Vinyl monomers containing moieties and epoxy functionality can be manufactured by the following reaction sequence. A vinyl monomer having hindered mono-, di-, or triisocyanate functionality of the formula (XV):

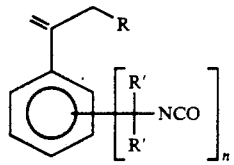

XV wherein each R' is independently a $C_{1-6}$ alkyl, R is H or R', and n=1-3, can be reacted with a polyepoxy (which includes diepoxy) compound to form a vinyl monomer having an oxazolidone moiety and one epoxy functionality.

Preferred oxazolidone monomers are oxazolidone monomers prepared from aromatic vinyl monomers having one or two pendant hindered isocyanate groups. The more preferred oxazolidone-containing monomers are oxazolidone monomers prepared from aromatic vinyl monomers having a single pendant hindered isocyanate groups. Representative examples of such a monomer are meta- and para-TMI, also known as 3-isopropenyl($\alpha,\alpha$-dimethylbenzyl)isocyanate and 4-isopropenyl($\alpha,\alpha$-dimethylbenzyl)isocyanate, respectively.

Such a hindered isocyanate compound is then reacted with an approximately double equivalent amount of a polyepoxy compound, such as diglycidyl ether of butanediol 0.025 equivalent of NCO among others as discussed above. Preferably, the monoisocyanate compound is reacted with a diepoxy compound selected from the group consisting of diglycidyl ethers of bisphenol A, bisphenol F, hydrogenated bisphenol A, butanediol, neopentylglycol, or mixtures thereof. The resultant products are vinyl monomers containing oxazolidone functionality. with reactive epoxy functionality. For a structural representation of such a compound see Example 6 below.

Such a reaction can also be repeated to generate a linear polyoxazolidone substituent on the vinyl monomer. The vinyl monomers formed using the above described chemistry can be combined in typical vinyl polymerization chemistry to form vinyl polymers having oxazolidone or polyoxazolidone moieties and functionality in the side chain. Such vinyl monomers and polymers are useful as crosslinking agents, polymerizable adhesion promoters, etc.

The vinyl polymers of the invention can be obtained by polymerizing the, oxazolidone-containing vinyl monomer with other vinyl monomers such as ethylene, propylene, styrene, acrylonitrile, vinyl acetate, vinyl chloride, maleic acid, acrylic acid, methacrylic acid, acrylamide, an ester of $\alpha,\beta$-unsaturated carboxylic acids and alcohols of the formula (XVI):

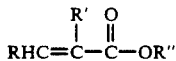

XVI wherein R may be H, $CH_3$, $C_2H_5$; R' may be H or an alkyl group ranging from $CH_3$ to $C_4H_9$; and R" may be derived from: (i) $CH_3$ to $C_4H_9$ straight chain alcohols; (ii)) saturated or unsaturated cyclic alcohols containing up to 20 carbon atoms; (iii) $C_3H_7$ to $C_{16}H_{37}$ branched alkyl or $C_5H_{11}$ to $C_{22}H_{45}$ straight chain alkyl alcohols; and (iv) alkoxy or aryloxy alkyl alcohols, etc.

The esters formed with the straight chain alcohols defined above which are useful as hydrophobic monomers include methyl acrylate, methyl methacrylate, ethyl acrylate, ethyl methacrylate, propyl acrylate, propyl methacrylate, butyl acrylate or butyl methacrylate. Esters formed with saturated or unsaturated cyclic alcohols described above which are useful as hydrophobic monomers include cyclohexyl acrylate, cyclohexyl methacrylate, benzyl acrylate, benzyl methacrylate, isobornyl acrylate, isobornyl methacrylate, adamatyl acrylate, adamantyl methacrylate, furfuryl acrylate and furfuryl methacrylate. Esters of branched alkyl or straight chain higher alkyl alcohols described above which are useful as hydrophobic monomers include 2-ethylhexyl acrylate, 2-ethylhexyl methacrylate, isobutyl acrylate, isobutyl methacrylate, isooctyl acrylate, isooctyl methacrylate, dodecylacrylate, dodecyl methacrylate, octadodecyl acrylate and octadodecyl methacrylate. Esters of alkoxy or aryloxy alkyl alcohols useful as hydrophobic monomers include methoxyethyl acrylate, methoxyethyl methacrylate, ethoxyethyl acrylate, ethoxyethyl methacrylate, propoxyethyl acrylate, propoxyethyl methacrylate, butoxyethyl acrylate, butoxyethyl methacrylate, phenoxyethyl acrylate, and phenoxyethyl methacrylate.

Hydrophilic monomers can be copolymerized with the hydrophobic monomers described above in forming the copolymers. Suitable hydrophilic monomers include: (i) N-substituted acrylamides or methacrylamides; (ii) $\alpha,\beta$-acrylates and methacrylates and their homologs. N-substituted acrylamides or methacrylamides useful as hydrophilic monomers include diacetone acrylamide and its homologs as described in U.S. Pat. No. 3,277,056, dimethyl acrylamide, butyl acrylamide, octyl acrylamide, and isobutyl methyl acrylamide. The $\alpha,\beta$-unsaturated carboxyl acid hydrophilic monomers include acrylic acid, methacrylic acid, crotonic acid, itaconic acid, maleic acid and fumaric acid.

The hydroxyalkyl acrylate and methacrylate hydrophilic monomers and their homologs include hydroxyethyl acrylate and methacrylate, diethylene glycol monoacrylate and monomethacrylate, triethylene glycol monoacrylate and monomethacrylate, polyethylene glycol monoacrylate and monomethacrylate of molecular weight up to 1000, linear or branched hydroxypropyl acrylate and methacrylate, dipropylene glycol monoacrylate and monomethacrylate, tripropylene glycol monoacrylate and monomethacrylate, tetrapropylene glycol monoacrylate and monomethacrylate, and polypropylene glycol monoacrylate and monomethylacrylate of molecular weight up to 1000.

Suitable solvents or carriers in which said hydrophobic and hydrophilic monomers may be polymerized include ethyl acetate, amyl acetate, butyl acetate, butyl cellosolve acetate, cellosolve acetate, methyl cellosolve acetate, acetone, methyl ethyl ketone, methyl isobutyl ketone, butyl cellosolve, cellosolve, methyl cellosolve, ethyl alcohol, isopropyl alcohol, butyl alcohol, toluene, and xylene. Other solvents may also be used as carriers as will be appreciated by those skilled in the art. Suitable carriers may also include any one or a mixture of any of the foregoing solvents in any proportion.

Generally, the process for preparing the copolymer involves mixing the hydrophobic and hydrophilic monomers in a suitable solvent/carrier selected from those set forth hereinabove to form a uniform mixture, and inducing polymerization. Polymerization may be induced by conventional initiators such as peroxides and the like, or by irradiation or redox systems. Polymerization usually occurs at temperatures between about 0° C. and 120° C., and preferably at the reflux temperature of the solvent/carrier.

Prepolymer Chemistry

Prepolymers useful in the oxazolidone systems of this invention comprise viscous liquid, semisolid and solid prepolymers. Typically these are made by first forming an isocyanate-terminated prepolymer comprising the reaction product of a polymeric polyol having at least two hydroxy (—OH) groups and the hindered polyisocyanate compound of the invention. Subsequently this isocyanate-terminated prepolymer is reacted with a polyepoxy compound to form an epoxy capped oxazolidone containing prepolymer.

In the reaction forming the isocyanate-terminated prepolymer there is greater than 1 (i.e.) about 1.1 to 5 equivalents of —NCO per equivalent of hydroxy functionality in the polymeric polyol. The reaction is typically carried out neat at an elevated temperature in the range of about 80° C. to about 250° C. for a period of time up to about 10 hours. In the reaction between the polyepoxy compound and the isocyanate-terminated prepolymer there is preferably greater than 1 (i.e.) about 1.1 to 10 equivalents of epoxy functionality per equivalent of —NCO functionality. This reaction is carried out in the presence of a zinc halide catalyst under the reaction conditions outlined above for the isocyanate-epoxide reaction of the invention.

Polyhydroxy compounds suitable for forming the prepolymers of the invention are generally fluid compositions at room temperature and have a molecular weight and hydroxy functionality which will result in a prepolymer of manageable viscosity. Typically a suitable polyhydroxy compound can have a molecular weight less than about 20,000 or typically less than 10,000, preferably in the range of 1,000 to 6,000, most preferably for reasons of reactivity viscosity controlling commercial availability of about 2,000 to 5,000. The hydroxy functionality of the compounds typically range from about 2-4. The higher hydroxy functionalities can result in prepolymers of unacceptably high viscosity. We have found that brominated or phosphorylated polyols used alone or in combination with standard polyols can enhance flame resistant properties.

Preferred polyhydroxy compounds, i.e., polyols, include polyoxyalkylene compounds having at least two hydroxy groups in the molecule. Examples of such compounds are polyethylene glycols, polypropylene glycols, polytetramethylene glycols, polybutylene glycols, polybutadiene diols and triols, low molecular weight hydroxy-containing polyesters, hydroxy-containing polyester amides, polyalkylene ether glycol compounds, hydroxy-containing oils, including tongue oil and their alkyl modifications, most preferred hydroxy-containing compounds are polymeric diols or triols of a molecular weight resulting in the desired viscosity for the end product. The hindered isocyanate compounds and the epoxy compounds used for forming the prepolymers of this invention are recited above.

The epoxy-terminated oxazolidone-containing compounds, polymers, and prepolymers of the invention can be cured with typical epoxy reactive compounds. In the most typical situation, the epoxy compound reacts with a compound having a free reactive hydrogen compound. The following examples of compositions are illustrative of this.

(1) Compositions can be prepared from an admixture which can comprise (a) an epoxy-terminated oxazolidone compound and (b) a polyfunctional amine, i.e., an amine having at least two active amino hydrogen atoms which can be on the same nitrogen atom or different nitrogen atoms, preferably in an amount sufficient to provide between about 0.2 to 4.0 amino hydrogen atoms per epoxy group of said oxazolidone and preferably between about 0.5 to 2.0 amino hydrogen atoms per epoxy group. Suitable polyfunctional amines include monoamines, diamines, triamines, and higher polyamines such as 2-ethylhexylamine, aniline, phenethylamine, cyclohexylamine, 2-aminohexanol, 1,3-diamino-2-propanol, ethylenediamine, butylenediamine, xylylenediamine, hexamethylenediamine, dihexylenetriamine, diethylenetriamine, triethylenetetraamine, p,p'-sulfonyldiamine, p,p'-methylenedianiline, 4,4'-methylenedianiline, and the like.

(2) Curable compositions can be prepared from an admixture which can comprise (a) an epoxy-terminated oxazolidone compound and (b) a polycarboxylic acid. Illustrative polycarboxylic acids which can be employed include aliphatic, aromatic, and cycloaliphatic polycarboxylic acids such as oxalic acid, malonic acid, glutaric acid, maleic acid, suberic acid, citraconic acid, 1,2-cyclohexanedicarboxylic acid, phthalic acid, 1,8-naphthalenedicarboxylic acid, 3-carboxycinnamic acid, 1,2,4-butanetricarboxylic acid, 1,2,4-hexanetricarboxylic acid, 1,2,4-benzenetricarboxylic acid, and the like; polycarboxy polyesters, i.e., polyesters containing more than one carboxy group per molecule, such as polycarboxylic acids of the typed exemplified above.

(3) Curable compositions can be prepared from an admixture which ca comprise (a) an epoxy-terminated oxazolidone compound and (b) a polyol, i.e., an organic compound having at least two hydroxy groups which are alcoholic hydroxy groups, phenolic hydroxy groups, or both alcoholic and phenolic hydroxy groups, e.g., aliphatic and cycloaliphatic polyalcohols and polyhydric phenols. The polyol is employed in an amount which provides between about 0.2 and 4.0 active hydrogen-containing hydroxy equivalents per epoxy equivalent of said oxazolidone. The compositions can be further modified by incorporating therein a polycarboxylic acid compound such as those illustrated in Section (2) above. Typical polyols which can be employed include ethylene glycol, diethylene glycol, glycerol, polypropylene glycols, butanediol, triethanolamine, pentaerythritol, trimethylolethane bis(4-hydroxyphenyl)methane, inositol, sorbitol, ttrimethylolphenol, resorcinol, pyrogallol, hydroquinone, 1,8-naphthalenediol, 2,4,6-trimethylolphenol allyl ether, cyclohexanediol, and the like.

(4) Curable compositions can be prepared from an admixture which can comprise (a) an epoxy-terminated oxazolidone compound and (b) a polycarboxylic acid such as those illustrated in .Section (2) above in an amount sufficient to provide between 0.3 and 3.0 carboxy equivalents per epoxy equivalent of said isocyanate oxazolidone. A polyol of the type exemplified in Section (3) above can be employed to further modify the compositions. In these admixtures the polycarboxylic acid is a major component as compared with the polyol modifier.

(5) Curable compositions can be prepared from an admixture which can comprise (a) an epoxy-terminated oxazolidone and (b) any one of the following classes of compounds, namely, polythiols such as the sulfur analogs of the polyols listed in Section (3) above, phenol-aldehyde condensates, urea-aldehyde condensates, melamine-aldehyde condensates, polyamines, polyamides, polycarboxylic acid halides, and the like.

(6) Curable compositions can be prepared from latent one component systems of epoxy-functional oxazolidones. This could include curing by heat, UV, or other means. Catalysts for heat curing include dicyandiamide, $BF_3$.amine salts such as $BF_3$.monoethylamine, imidazoles such as 2-ethyl-4-methylimidazole, benzyldimethylamine, bicyclic amidines, bicyclic amidine salts, and other quaternary amine salts such as benzyltriethylammonium chloride.

(7) Curable compositions can be prepared from an admixture which can comprise, (a) an epoxy-terminated oxazolidone and (b) a diisocyanate or isocyanate prepolymer. The isocyanates could be TMXDI, MDI (4,4'-diphenylmethane diisocyanate), TDI (tolylene diisocyanate), IPDI (isophorone diisocyanate), etc.

The epoxy-terminated oxazolidone compounds and their cured resins exhibit excellent thermal properties, good chemical and solvent stability, and excellent toughness and flexibility. They can be used in functional materials such as adhesives, coatings, sealants, caulks, and structural laminates. In preparing such materials, the compositions can include additives such as fillers, thickeners, fibers, antioxidants, pigments, surfactants, etc.

The following examples further illustrate the invention and contain the best mode.

EXAMPLE 1

Preparation of a Linear Oxazolidone Polymer Using Zinc Iodide

Into a 50 ml glass jar, having a screw-on lid, was placed about 9.5 parts by weight of a diglycidyl ether of bisphenol A (EPON TM 828) and 6.1 parts of 1,3-bis($\alpha$-isocyanatoisopropyl)benzene (m-TMXDI, 0.05 equivalents) with 0.2 parts by weight of zinc iodide. The glass jar was sealed and placed in an oven at 200° C. After 15 minutes of reaction time, the contents of the glass jar showed an increase in viscosity. After 20 minutes the contents of the glass jar darkened, and after 35 minutes the contents showed a further increase in viscosity. Upon a further lapse of time, the viscosity of the contents of the glass jar did not appear to change.

The above reactants were mixed at a 1:1 molar ratio of —NCO to epoxy groups. A hard brittle solid formed. According to IR analysis, no residual —NCO nor epoxy functionality remained. The major feature of the IR was an absorbance band at 1750 cm$^{-1}$ to the carbonyl absorption of an oxazolidone ring. This evidence clearly indicates the stoichiometric conversion of the reactants forming a linear oxazolidone polymer in the absence of detectable levels of isocyanurate trimer.

Example 2

Comparative Example

Example 1 was repeated exactly except that 0.2 parts of a di-$C_{15}$-alkyldimethylammonium chloride was used in place of the 0.2 parts of zinc iodide. The contents of the glass jar showed no initial reaction and the product appeared to be only slightly thickened at the end of the reaction.

EXAMPLE 3

Comparative Example

Example 1 was repeated exactly except that the 0.2 parts by weight of zinc iodide was replaced by 0.2 parts by weight of 2-ethyl-4-methylimidazole. After 20 minutes, the contents of the glass jar became a dark solid mass comprising a crosslinked epoxide and free m-TMXDI.

EXAMPLE 4

Preparation of an Isocyanate-Terminated Prepolymer

Into a 2 liter reaction vessel equipped with a reflux condenser, nitrogen gas inlet, mechanical stirrer, and thermometer was added 183.0 g of m-TMXDI (1.5 equivalents) and 266.0 g of Polymeg TM 1000 (polyethylene glycol, 0.52 equivalents). The reaction mixture was heated to 80° C. and maintained at this temperature for 2 hours. At this time the reaction mixture had a measured % NCO of 10.34%.

EXAMPLE 5

Preparation of an Oxazolidone from a Prepolymer

A 250 ml three-necked round bottom flask was equipped with a reflux condenser, an inert nitrogen gas inlet, a magnetic spin bar, and a thermometer. The flask was charged with 110 ml of dimethylformamide, 19.0 gm of a diglycidyl ether of bisphenol A (0.10 equivalents, EPON TM 828), 40.8 g (0.10 equivalents based on the —NCO content) of the prepolymer of Example 4, and 0.96 g (3.0 mM) of zinc iodide. The reaction mixture was heated to 140° C. and maintained at that temperature for 3 hours 30 minutes. Upon cooling, the contents of the flask gelled to a solid mass. An inspection of the infrared spectrum of the sample showed little or no absorption at 2270 cm$^{-1}$, which is characteristic of free isocyanate, and a weak absorption at 910 cm$^{-1}$, which indicates a substantial absence of epoxy functionality. A strong absorption centered at about 1751 cm$^{-1}$ was observed, which indicates the presence of substantial quantities of oxazolidone functionality.

EXAMPLE 6

Preparation of a Vinyl Monomer Containing Oxazolidone Moieties and Epoxy Functionalities Into a 50 ml glass jar equipped with a screw-on lid was placed a 5.0 g of 3-isopropenyl($\alpha,\alpha$-dimethylbenzyl)isocyanate (m-TMI, 0.025 equivalent of NCO) and 8.8 g of a diglycidyl ether of bisphenol A (EPON TM 825, 0.05 equivalent of epoxy groups) and 0.05 g of zinc iodide. The jar was sealed and placed into an oven and heated for 2 hours at 125° C. The material in the jar was semisolid at the end of the period, having a softening point between 30° C. and 50° C. An infrared analysis of the reaction mixture indicated the presence of epoxy functionality and oxazolidone functionality with a substantial absence of residual isocyanate. The proposed structure of the resulting reaction product is as follows:

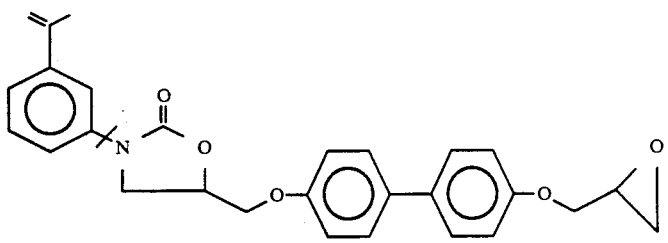

EXAMPLE 7

Comparative Example: Preparation of a Linear Oxazolidone Using a Nonhindered Isocyanate Into a 50 ml glass jar equipped with a screw-on lid was placed 5.16 g of a diglycidyl ether of bisphenol A (EPON TM 825, 0.03 equivalents), 3.75 g of 4,4'-diphenylmethane diisocyanate (MONDUR TM M available from Mobay Chemicals, 0.03 equivalents), and 0.1 g zinc iodide. The jar was sealed and placed in an oven at 125° C. for 2 hours. Upon cooling, the material was a viscous liquid.

Upon inspection of the reaction product by infrared analysis, a small amount of oxazolidone formation was shown by the presence of a weak absorption at 1755 cm$^{-1}$, a very incomplete reaction due to the presence of a strong absorption at 2274 cm$^{-1}$ due to the presence of substantial unreacted isocyanate. However, more significantly, substantial amounts of isocyanurate was formed as shown by the strong absorption at 1710 cm$^{-1}$.

EXAMPLE 7

Comparative Example: Preparation of Linear Oxazolidones Using Various Catalysts Example 1 was repeated using the catalyst, epoxy, and hindered isocyanate as shown in the Table 1. The results of the reactions are shown in the last column.

The results of the various experiments shown in this example indicate that certain compounds, as for example some tetraalkyl ammonium halide materials, have some activity in promoting the reaction between the hindered isocyanate and an epoxy compound to form an oxazolidone compound. However, these compounds do not catalyze the reaction at an efficient enough rate for commercial feasibility when compared to the zinc halide compounds, particularly $ZnI_2$.

It is also noted that the zinc halide catalysts generally need to be relatively soluble in the reactant mixture for best results. This is illustrated in an example in Table 1 in which $ZnBr_2$ was used. Although $ZnBr_2$ is effectively and advantageously used in many systems, it is believed that it was not soluble enough in the reactant mixture of EPON TM 828 and m-TMXDI to affect curing.

TABLE 1

| Catalyst | Amount | EPON TM 828 | m-TMXDI | Results |
|---|---|---|---|---|
| LiCl | 0.20 | 9.40 | 6.10 | No Curing (NC) |
| KBr | 0.20 | 9.40 | 6.10 | NC |
| BTEAC[1] | 0.20 | 9.40 | 6.10 | Cured to a Solid |
| Zn (acac)$_2$[2] | 0.20 | 9.40 | 6.10 | NC |
| Fe (acac)$_3$ | 0.20 | 9.40 | 6.10 | NC |
| Cu (acac)$_2$ | 0.20 | 9.40 | 6.10 | NC |
| Ni (acac)$_2$ | 0.20 | 9.40 | 6.10 | NC |
| ZnO$_2$[3] | 0.10 | 5.00 | 4.40 | NC |
| NiO$_2$ | 0.10 | 5.00 | 4.40 | NC |
| Sodium Acetate | 0.20 | 9.40 | 6.10 | NC |
| KI | 0.20 | 9.40 | 6.10 | NC |
| AlCl$_3$ | 0.20 | 9.40 | 6.10 | NC |
| V (acac)$_2$ | 0.20 | 9.40 | 6.10 | NC |
| Cr (acac)$_2$ | 0.20 | 9.40 | 6.10 | NC |
| Co (acac)$_3$ | 0.20 | 9.40 | 6.10 | NC |
| Mn (acac)$_2$ | 0.20 | 9.40 | 6.10 | NC |
| Triphenyl Phosphine | 0.20 | 9.40 | 6.10 | NC |
| Co (acac)$_2$ | 0.20 | 9.40 | 6.10 | NC |
| Tetra (t-butyl) phosphonium bromide | 0.20 | 9.40 | 6.10 | Some Thickening |
| ZnCl$_2$ | 0.20 | 9.40 | 6.10 | Very Thick |
| KIO$_3$ | 0.20 | 9.40 | 6.10 | NC |
| NiCl$_2$ | 0.20 | 9.40 | 6.10 | NC |
| CuCl | 0.20 | 9.40 | 6.10 | NC |
| FeCl$_2$ | 0.20 | 9.40 | 6.10 | Thick |
| ZnSO$_4$ | 0.20 | 9.40 | 6.10 | NC |
| CaCl$_2$ | 0.20 | 9.40 | 6.10 | Slight Thickening |
| CuSO$_4$ | 0.20 | 9.40 | 6.10 | NC |
| MnO$_2$ | 0.20 | 9.40 | 6.10 | NC |
| AlK (SO$_4$)$_2$ | 0.20 | 9.40 | 6.10 | NC |
| FeCl$_3$ | 0.20 | 9.40 | 6.10 | Very Thick |
| Fe$_2$ (SO$_4$)$_3$ | 0.20 | 9.40 | 6.10 | NC |
| MgSO$_4$ | 0.20 | 9.40 | 6.10 | NC |
| PdCl | 0.20 | 9.40 | 6.10 | NC |
| ZnBr$_2$ | 0.20 | 9.40 | 6.10 | NC |
| Zn (OAc)$_2$ | 0.20 | 9.40 | 6.10 | NC |
| Tetra Ethyl Ammonium Bromide | 0.20 | 9.40 | 6.10 | NC |

TABLE 1-continued

| Catalyst | Amount | EPON TM 828 | m-TMXDI | Results |
| --- | --- | --- | --- | --- |
| Tetra Methyl Ammonium Bromide | 0.20 | 9.40 | 6.10 | NC |
| Tetra Methyl Ammonium Chloride | 0.20 | 9.40 | 6.10 | NC |
| Tetra Ethyl Ammonium Iodide | 0.20 | 9.40 | 6.10 | NC |
| Tetra Butyl Ammonium Iodide | 0.20 | 9.40 | 6.10 | Thickening |
| Tetra Butyl Ammonium Bromide | 0.20 | 9.40 | 6.10 | Thick, No Flow |
| Tetra Butyl Ammonium Chloride | 0.20 | 9.40 | 6.10 | Solid |
| Tetra Ethyl Ammonium Chloride-hydrate | 0.20 | 9.40 | 6.10 | Solid |
| LiBr | 0.15 | 9.40 | 6.10 | EPON TM & EPON TM / TMXDI Reaction |

[1]Benzyltriethylammonium chloride
[2]Acetylacetonate ($CH_3COCH_2CO^-$)
[3]Substituted DER TM 332 and m-TMI for EPON TM 828 and m-TMXDI.

EXAMPLE 9

Preparation of an Isocyanate-Terminated Prepolymer

Into a 2 liter reaction vessel equipped with a reflux condenser, a nitrogen gas inlet, a mechanical stirrer, and a thermometer was added 1001.8 g of PEG TM 1000 (polyethylene glycol, 2.0 equivalents) and 488.6 g .of m-TMXDI (4.0 equivalents). The reaction mixture was heated to 170° C. and maintained there until the % NCO reached 5.3% (approximately hours).

EXAMPLE 10

Preparation of an Oxazolidone from an Isocyanate-Terminated Prepolymer

Into a 1 liter reaction vessel equipped with a reflux condenser, a nitrogen gas inlet, a mechanical stirrer, and a thermometer was added 200 g of the prepolymer made in Example 10 (0.253 equivalents) and 200 g of Epon TM 828 (1.064 of KI and $Zn(OAc)_2.2H_2O$ (0.0032 equivalents) was added. The reaction mixture was heated to 150° C. and maintained at that temperature until the epoxy equivalent weight reached 470 (approximately 2 hours).

EXAMPLE 11

Preparation of an Oxazolidone from an Isocyanate-Terminated Prepolymer

Into a 1 liter reaction vessel equipped with a reflux condenser, a nitrogen gas inlet, a mechanical stirrer, and a thermometer was added 200 g of the prepolymer made in Example 10 (0.253 equivalents) and 200 g of Epon TM 828 (1.064 equivalents). To this was added 1.23 g of a 2:3 (w/w) mixture of KI and $Zn(OAc)_2.2H_2O$ (0.0016 equivalents of KI and 0.0032 equivalents of $Zn(OAc)_2.2H_2O$). The reaction mixture was heated to 150° C. and maintained there until the epoxy equivalent weight reached 484 (approximately 2 hours).

EXAMPLE 12

Preparation and Testing of an Adhesive Formulation Using an Epoxy-Terminated Oxazolidone An isocyanate-terminated prepolymer was formed by charging a two liter reaction kettle with 1101.44 g of Terathane TM 2900 (1470 equivalent weight, 0.75 equivalents, a polyol available from duPont) and 183.23 g of m-TMXDI (122.15 equivalent weight, 1.50 equivalents, available from American Cyanamid). The mixture was stirred under an atmosphere of nitrogen. The temperature was increased to 350° F. (177° C.) and maintained at that temperature for two hours. At this time the % NCO was 2.57% (theoretical 2.45%).

An epoxy-terminated oxazolidone was formed using 850 g of this prepolymer (0.50 equivalents), 850 g of EPON TM 828 (188 equivalent weight, 4.52 equivalents), and 2.04 g $ZnI_2$ (319.18 equivalent weight, 0.0064 equivalents). These components were charged into a two liter reaction kettle and stirred under nitrogen. The material was heated to 150° C. and held at that temperature for 4 hours. At that time an IR scan showed no residual —NCO.

The following adhesive formulations were prepared using this epoxy-terminated oxazolidone and using standard curing procedures. All amounts are in grams. Cab-O-Sil TM M-5 is a fumed silica, which is used as a thickener, and is available from Cabot Corporation. The adhesive formulations were used to bond chromic acid etched 2024-T3 aluminum by curing at 350° F. (177° C.) for 2 hours. Single lap shear results at room temperature (performed according to ASTM D-1002 procedure) are also provided in Table 3.

TABLE 2

| Material | 1 | 2 | 3 | 4 |
| --- | --- | --- | --- | --- |
| Epoxy Oxazolidone | 2.98 | 1.75 | 4.65 | 2.92 |
| EPON TM 828 | 7.08 | 8.25 | 5.35 | 6.87 |
| Dicyandiamide | 0.64 | 0.46 | 0.38 | 0.46 |
| Cab-0-Sil TM M-5 | 0.30 | 0.30 | 0.30 | 0.30 |

TABLE 3

| Formulation | 1 | 2 | 3 | 4 |
| --- | --- | --- | --- | --- |
| Lap Shear (p.s.i.) | 3390 | 3300 | 1620 | 2990 |

The above specification, Examples, and data provide a description of the invention as it is currently understood. However, since many embodiments of the invention can be made without departing from the spirit and scope of the invention, the invention is embodied in the claims hereafter appended.

We claim:

1. A linear polymer comprising a polymer sequence having alternating residues derived from a reaction between a hindered diisocyanate compound and a diepoxy compound, wherein the linear polymer is substantially free of an isocyanurate, a biuret or an allophanate reaction by-product.

2. The linear polymer of claim 1 wherein for each -NCO equivalent of the hindered diisocyanate compound there is about 0.2 to 5 epoxy equivalents of the diepoxy compound.

3. The linear polymer of claim 1 wherein there are approximately equimolar proportions of hindered diisocyanate compound and diepoxy compound.

4. The linear polymer of claim 3 wherein the diepoxy compound comprises a diglycidyl ether of (i) bisphenol A, (ii) bisphenol F, (iii) hydrogenated bisphenol A, (iv) butanediol, (v) neopentylglycol, or (vi( mixtures thereof.

5. The linear polymer of claim 4 wherein the hindered diisocyanate compound comprises 1,3-bis-(α-isocyanatoisopropyl)benzene or 1,4-bis-(α-isocyanatoisopropyl)benzene.

6. The linear polymer of claim 3 having a molecular weight of about 400 to 500,000.

7. The linear polymer of claim 1 which comprises less than about 1 wt-% of an isocyanurate compound.

8. The linear polymer of claim 1 wherein the reaction product contains less than about 2 wt-% of a zinc halide catalyst residue.

9. The linear polymer of claim 1 wherein the hindered diisocyanate compound comprises an aromatic diisocyanate.

10. The linear polymer of claim 9 wherein the hindered diisocyanate compound comprises 1,3-bis-(α-isocyanatoisopropyl)benzene.

11. A vinyl monomer composition comprising a reaction product of:
   (a) a hindered isocyanate compound of the formula:

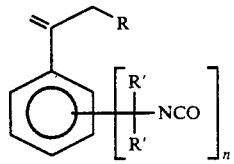

wherein each R' is independently a $C_{1-6}$ alkyl, R is H or R', and n=1-3; and
   (b) a polyepoxy compound; wherein the reaction product has epoxy functionality and is substantially free of an isocyanurate, a biuret or an allophanate reaction by-product.

12. The vinyl monomer of claim 11 wherein the reaction product is formed using a mono-isocyanato compound and a diepoxy compound.

13. The vinyl monomer of claim 12 wherein the epoxy compound is selected from the group consisting of a diglycidyl ether of (i) bisphenol A, (ii) bisphenol F, (iii) hydrogenated bisphenol A, (iv) butanediol, (v) neopentylglycol, and (vi) mixtures thereof.

14. The vinyl monomer of claim 11 which comprises less than about 1 wt-% of an isocyanurate compound.

15. The vinyl monomer of claim 11 wherein the reaction product is formed in the presence of less than about 4 wt-% zinc halide.

16. The vinyl monomer of claim 11 wherein the reaction product is formed in the presence of less than about 2 wt-% zinc iodide.

17. The vinyl monomer of claim 11 wherein n is 1.

18. A vinyl polymer composition comprising a reaction product of:
   (a) a hindered isocyanate compound of the formula:

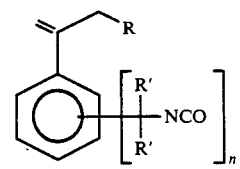

wherein each R' is independently a $C_{1-6}$ alkyl, R is H or R', and n=1-3;
   (b) a polyepoxy compound; and
   (c) a vinyl monomer; wherein the reaction product has epoxy functionality and is substantially free of an isocyanurate, a biuret or a allophanate reaction by-product.

19. The vinyl polymer composition of claim 18 wherein the vinyl monomer is of the formula:

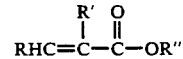

wherein R may be H, $CH_3$, or $C_2H_5$; R' may be H or an alkyl group ranging from $CH_3$ to $C_4H_9$; and R" may be derived from:
   (a) H, $CH_3$—to $C_4H_9$—;
   (b) saturated or unsaturated cyclic alcohols containing up to 20 carbon atoms;
   (c) $C_3H_7$ to $C_{16}H_{37}$ branched alkyl or $C_5H_{11}$ to $C_{22}H_{45}$ straight chain alkyl alcohols; or
   (d) alkoxy or aryloxy alkyl alcohols.

20. The vinyl polymer composition of claim 18 wherein n is 1.

21. An epoxy-terminated oxazolidone prepolymer comprising the reaction product of:
   (a) an isocyanate-terminated prepolymer comprising the reaction product of:
      (i) a hindered polyisocyanate compound; and
      (ii) a polymeric polyol compound having at least two hydroxy groups; and
   (b) a polyepoxy compound.

22. The epoxy-terminated oxazolidone prepolymer of claim 21 wherein the hindered polyisocyanate compound is a hindered diisocyanate compound.

23. The epoxy-terminated oxazolidone prepolymer of claim 21 wherein the polyol comprises a polyoxyalkylene compound.

24. The epoxy-terminated oxazolidone prepolymer of claim 21 wherein the polyepoxy compound comprises a diepoxy compound.

25. The epoxy-terminated oxazolidone prepolymer of claim 24 wherein the diepoxy compound comprises a diglycidyl ether of (i) bisphenol A, (ii) bisphenol F, (iii) hydrogenated bisphenol A, iv) butanediol, (v) neopentylglycol, or (vi) mixtures thereof.

26. The epoxy-terminated oxazolidone prepolymer of claim 21 wherein in the reaction forming the isocyanate-terminated prepolymer there is about 1.1 to 5 equivalents of —NCO per equivalent of hydroxy group in the polymeric polyol.

27. The epoxy-terminated oxazolidone prepolymer of claim 21 wherein in the reaction between the polyepoxy compound and the isocyanate-terminated prepolymer there is about 1.1 to 10 equivalents of epoxy functionality per equivalent of —NCO functionality.

28. A process for the manufacture of oxazolidone compounds comprising the reaction of an epoxy compound and a hindered isocyanate compound wherein the reaction is conducted at a ratio of about 0.2 to 20 equivalents of epoxy functionality per equivalent to —NCO functionality and in the presence of an effective catalytic amount of a zinc halide or in situ generated zinc halide compound.

29. The process according to claim 28 wherein the zinc halide is preferably zinc iodide.

30. The process according to claim 28 wherein the reaction is carried out in the melt.

31. The process according to claim 30 wherein the reaction is carried out at a temperature of about 80° C. to about 250° C.

* * * * *

UNITED STATES PATENT AND TRADEMARK OFFICE
CERTIFICATE OF CORRECTION

PATENT NO. : 5,138,016            Page 1 of 2
DATED : August 11, 1992
INVENTOR(S) : Thomas O. Murdock and Brian W. Carlson It is certified that error appears in the above-identified patent and that said Letters Patent is hereby corrected as shown below:

Column 10, Line 45,46 "  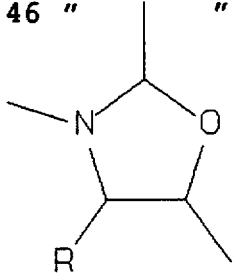  "

should read -- 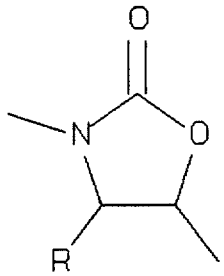 --

Column 11, Line 37, insert --or bisphenol A-- after the word "butanediol".
    Column 19, Line 34, "10" should read --9--.

UNITED STATES PATENT AND TRADEMARK OFFICE
CERTIFICATE OF CORRECTION

PATENT NO. : 5,138,016
DATED : August 11, 1992
INVENTOR(S) : Thomas O. Murdock and Brian W. Carlson It is certified that error appears in the above-indentified patent and that said Letters Patent is hereby corrected as shown below:

Column 19, Line 35, insert --equivalents). Following this, 1.74 g of a 3:2 (w/w) mixture-- after the numerals "(1.064".

Signed and Sealed this

Twelfth Day of October, 1993

Attest:

BRUCE LEHMAN

Attesting Officer                Commissioner of Patents and Trademarks